Patented May 19, 1942

2,283,250

UNITED STATES PATENT OFFICE 2,283,250

MANUFACTURE OF REFRACTORY MATERIALS

Victor Moritz Goldschmidt, Holmenkollen, near Oslo, and Kristoffer Johannes Stenvik, Oslo, Norway No Drawing. Application May 13, 1937, Serial No. 142,492. In Austria May 18, 1936

16 Claims. (Cl. 106—59)

The present invention relates to the manufacture of refractory materials. It is known to incorporate fluxes or bonding materials to the batches from which refractories are to be manufactured. According to the present invention one adds to the raw materials of refractories subordinate amounts of such metals or of such metal alloys which are capable of forming during the process of firing such oxygen compounds which are capable to coalesce with the main constituent or with main constituents of the building material or of the batch, forming refractory substances. By such a process of coalescence or fusing one can achieve a very strong bonding, sintering or consolidation of the refractory material, as refractory substances are being formed through the interaction of fused metals or fused oxygen compounds.

The incorporation of the metals or the metal alloys has to be made in such a manner that no undesirable changes or alternates are taking place before the process of firing. For instance, one has to avoid such bonding liquids or such plastifiers which are able to enter into undesirable chemical reactions with the metal or with the metal alloy. If, for instance, such reactive alloys of light metals, as magnesium or aluminium, are being used, one has to avoid the use of water or aqueous solutions. In such cases one can use plastifiers organic liquids, such as heavy mineral oils.

Also one has to avoid such metals and such metal alloys, the products of oxydation of which are giving objectionable fuses with low melting point in the presence of refractory materials, such as for instance sodium or potassium.

The present invention is suitable for the bonding of refractory building materials, especially such materials which consist dominatingly of magnesium orthosilicate, for instance olivine, or which consist of magnesium oxide, for instance calcined magnesite, or which consist of refractory chromium compounds, for instance chromium ore, or which contain mixtures of said refractory substances.

Just for these materials there have been difficulties hitherto as to find suitable bonding materials, especially such materials which are able to effectuate a satisfactory bonding already at comparatively moderate firing temperatures of about 1200–1400° C.

As fluxing and bonding materials according to the present invention one has to consider among others finely divided metals and metal alloys of the iron group, such as for instance chromium, manganese and iron, and especially also alloys of such metals with semi metals, such as for instance silicon.

Suitably, one has to use brittle metals and brittle alloys which easily can be disintegrated. The amount of such bonding material is dependent upon the nature of the refractory material which has to be bonded, and is dependent also upon the properties desired from the product.

Usually it is sufficient to incorporate amounts of such metals and metal alloys ranging from 1 to 5% of the batch. In some cases one can use even higher amounts of such incorporations, for instance up to 10% or eventually even more.

The advantageous bonding properties of for instance silico-manganese, when used as a fluxing and bonding material for olivine refractories, seem to be due to the following phenomena.

During the process of firing the silico-manganese is melting and is impregnating the pores of the refractory with a film of liquid metal, or liquid manganese silicate, formed by subsequent oxydation of the metal. This manganese silicate is later on taken up by the olivine crystals, forming a refractory isomorphous mixture, after having bonded the olivine crystals.

If one uses a powdered alloy of chromium and iron, the products of oxydation give a refractory iron-chromium spinel as a bonding substance.

(1) For binding a refractory which consists essentially of silica, one can for instance use powdered calcium silicide. One has to take care that an oxydation of the calcium silicide during mixing and drying of the batch is being avoided, using preferably organic liquids as plastifiers.

For instance, one can crush 95 parts of quartz in the manner customary for the manufacture of silica bricks, and to this quartz there are added 5 parts of powdered calcium silicide, containing 67% Si, 33% Ca.

Eventually one can mill the calcium silicide jointly with the fine material of the quartz, and subsequently one can mix the milled goods with the granular fraction of the quartz.

The mixture is being plastified with a mineral oil, solar-oil being suitable, then the mixture is moulded in usual manner, for instance to produce bricks and subsequently the shapes are being fired at 1200–1500° C.

As a bonding material in that case one can also use magnesium silicide.

(2) For bonding natural or synthetical crystalline silicates of aluminium, such as sillimanite or mullite, one can use powdered alloys of aluminium and silicon, containing percent of aluminium, incorporating between 2 and 15 percent by weight of such alloys, preferably between 5 and 10% by weight and transforming the aluminium silicide into aluminium silicate through the process of firing.

(3) For bonding natural or synthetical corundum one can use finely subdivided aluminium or alloys rich in aluminium, forming corundum through the process of firing.

(4) For the bonding of sintered magnesite according to present invention one can use for instance silicides of magnesium, or silicides of iron, or alloys of iron with other metals of the iron group.

For instance one can use ferro chromium, containing about 50% Cr or ferro manganese, containing about 60% Mn. The manufacture for instance can take place in that manner that the metal alloy is being milled jointly with the fine powdery material of the magnesite, or with part of that fine material, and the milled goods are mixed with the granular sintered magnesite, using a suitable plastifying liquid. Then the batch is being moulded and the moulded shapes are being burned.

If magnesium silicide is being used, one can use as a plastifying liquid for instance solar-oil or tar. If ferro chromium or silicides of the metals of the iron groups are being used one can apply water as plastifying liquid. The fluxing and bonding metal or metal alloy can suitably amount to about 1 to 8% by weight of the material; in many cases 2 to 5% are suitable amounts.

The process of firing can be effectuated at temperatures of 1200–1500° C. The temperatures necessary being decidedly lower than what is necessary without the use of the metallic bonding material.

(5) For bonding such refractories which consist substantially of chrome ore or other refractory chrome compounds one can use ferro chromium, which contains for instance 40–60% Cr. In such use the presence of one or some few percents of carbon may be tolerable, allowing the use of even relatively inexpensive ferro chromium alloys containing some carbon.

The manufacture can take place in a manner analogous to that described in Example 2. During the process of firing there is formed, from the ferro chromium, a bonding substance essentially consisting of oxides of iron and chromium, eventually forming ferrous chromite, which cements the grains of the refractory material.

(6) For bonding a refractory material, consisting of substances rich in magnesium orthosilicate, for instance a refractory building material consisting essentially of olivine, one can use ferro silicon, an alloy consisting essentially of silicon and iron, containing for instance about 45% by weight of silicon and about 55% of iron. One can for instance use an amount of ferro silicon which constitutes about 5% of the entire refractory building material. One can mill those 5%, consisting of ferro silicon jointly with part of the olivine, and incorporate this mixture to a batch containing granular olivine. After making a batch, having added plastifiers, one can mould the material into desired shapes, dry and fire the shapes. During the process of firing the ferro silicon is oxidized to form iron silicates, acting as a flux and subsequently the iron silicates may either enter the refractory olivine crystals or the process of oxidation may proceed to form refractory bonding $Fe_2O_3$.

In analogous manner one can use ferro manganese as fluxing and bonding substance for magnesium orthosilicate refractories. One can for instance use alloys containing about 70 percent by weight of manganese and about 30 percent by weight of iron, or a silico ferro manganese, containing for instance about 60% Mn, 20% Fe, 20% Si, or such substances as ferro chromium.

(7) One can also use the method, described in the present invention to introduce a fluxing and bonding material into such refractories, which consist of a mixture of magnesium orthosilicate (for instance as the mineral olivine), which is present as granular material or dominatingly as granular material, and a fine material consisting of other refractory substances such as especially magnesium oxide, chromium compounds and mixtures of magnesium oxide and chromium compounds. One can work in the same manner as described in Example 4, for instance in such a manner, that the metals or metal alloys are mixed intimately with or milled jointly with the fine material of the refractory. Subsequently the fine material, including the metals which are to procure the bonding substance, and the granular material are mixed together, a batch is made, shapes, for instance bricks, are being moulded, dried and fired. During the process of firing the metals or metal alloys are oxidized, forming bonding oxygen compounds.

(8) A batch is made, containing about 70 percent by weight of granular olivine, the grain size being 0.3 till 4.0 mm. and 30 percent by weight of a fine material, the particle size of the fine material being below 0.1 mm. and for a greater part below 0.05 mm.

The fine material contains of 50 percent by weight chrome ore, preferably chrome ore low in alumina, containing not more than about 10–14% $Al_2O_3$, further the fine material contains 30% sintered magnesite, 15% caustical magnesite and 5 percent by weight of a silico ferro manganese, which latter contains about 65–70% Mn, 12–25% Fe, 15–25% Si. The mixture of coarse and fine material is being plastified by addition of water or of aqueous solution of organic or inorganic binders, such as cellulose waste liquor or small amounts of sodium silicate, the batch then is being moulded and is fired at a temperature of about 1400–1500° C., or at even higher temperatures.

In analogous manner one can use for instance alloys of chromium with iron and silicon as bonding materials for refractory building materials which consist substantially of mixtures of magnesium orthosilicate with other refractory substances such as sinter magnesite, chromite or a mixture of both of these. Hereby one can manufacture products, which have excellent mechanical strength even at very high temperatures. In some cases one may also use mixtures of several metallic materials to produce bonding substances by means of oxidation during the process of firing.

The same process can also be used for procuring bonding substances for such refractories, which are shipped in unfired, raw state, and which are subject to heating at the place of their service.

We claim:

1. A process for the manufacture of refractory products essentially comprising magnesium orthosilicate, which comprises admixing with a batch containing such magnesium orthosilicate 1% to 10% of at least one metal as a bonding material in a finely subdivided state and capable of forming an oxygen compound coalescing with said refractory upon burning of the refractory and then preparing shapes from said mixture.

2. A process for the manufacture of refractory products essentially comprising magnesium orthosilicate, which comprises admixing with a batch containing such magnesium orthosilicate 1% to 10% of at least one metal as a bonding material in a finely subdivided state and capable of forming an oxygen compound coalescing with said refractory upon burning of the refractory, preparing shapes from said mixture and submitting the shapes to a process of burning whereby such metal is transformed into compounds of the metal and oxygen which effect refractory bonding of the material.

3. A method according to claim 2 wherein olivine rock is employed as the material containing magnesium orthosilicate.

4. A method according to claim 2 wherein said bonding material is a brittle metal alloy.

5. A method according to claim 2 wherein said bonding material comprises at least one metal of the iron group.

6. A method according to claim 2 wherein said bonding material is a brittle alloy of at least one metal of the iron group.

7. A method according to claim 2 wherein said bonding material is a brittle alloy of at least one metal of the iron group with silicon.

8. A method according to claim 2 which includes incorporating with the mixture of refractory material and finely subdivided metal a liquid plastifyer which does not react with such metal in an objectionable manner.

9. A method according to claim 2 which includes firing the shapes at temperatures lower than the temperatures necessary for refractory bonding of the refractory material in the absence of the metal bonding material.

10. A method according to claim 2 which includes burning the shapes at temperatures between 1200° C. and 1400° C.

11. A process for the manufacture of refractory products substantially consisting of magnesium orthosilicate and a subordinate amount of other refractory material which comprises admixing with a batch containing magnesium orthosilicate and a subordinate amount of other refractory material 1% to 10% of at least one metal, as a bonding material, in a finely subdivided state and capable of forming an oxygen compound coalescing with said refractory materials upon burning of the refractory, preparing shapes from said mixture and submitting the shapes to a process of burning whereby such metal is transformed into compounds of the metal and oxygen which effect refractory bonding of the material.

12. A process for the manufacture of refractory products substantially consisting of magnesium orthosilicate and a subordinate amount of burned magnesite which comprises admixing with a batch containing magnesium orthosilicate and a subordinate amount of burned magnesite 1% to 10% of at least one metal, as a bonding material, in a finely subdivided state and capable of forming an oxygen compound coalescing with said refractory materials upon burning of the refractory, preparing shapes from said mixture and submitting the shapes to a process of burning whereby such metal is transformed into compounds of the metal and oxygen which effect refractory bonding of the material.

13. A process for the manufacture of refractory products substantially consisting of magnesium orthosilicate and a subordinate amount of material containing chromium which comprises admixing with a batch containing magnesium orthosilicate and a subordinate amount of material containing chromium 1% to 10% of at least one metal, as a bonding material, in a finely subdivided state and capable of forming an oxygen compound coalescing with said refractory materials upon burning of the refractory, preparing shapes from said mixture and submitting the shapes to a process of burning whereby such metal is transformed into compounds of the metal and oxygen which effect refractory bonding of the material.

14. A process for the manufacture of refractory products substantially consisting of magnesium orthosilicate and a subordinate amount of burned magnesite and material containing chromium which comprises admixing with a batch containing magnesium orthosilicate and a subordinate amount of burned magnesite and material containing chromium 1% to 10% of at least one metal, as a bonding material, in a finely subdivided state and capable of forming an oxygen compound coalescing with said refractory materials upon burning of the refractory, preparing shapes from said mixture and submitting the shapes to a process of burning whereby such metal is transformed into compounds of the metal and oxygen which effect refractory bonding of the material.

15. A process according to claim 11 wherein said bonding material is a brittle metal alloy.

16. A process according to claim 11 which includes firing the shapes at temperatures lower than the temperatures necessary for refractory bonding of the refractory material in the absence of the metal bonding material.

VICTOR MORITZ GOLDSCHMIDT.
KRISTOFFER JOHANNES STENVIK.